US011999857B2

(12) United States Patent
Gu

(10) Patent No.: US 11,999,857 B2
(45) Date of Patent: Jun. 4, 2024

(54) COATED PARTICLES AND METHODS OF MAKING AND USING THE SAME

(71) Applicant: W. R. Grace & Co.-Conn., Columbia, MD (US)

(72) Inventor: Feng Gu, Ellicott City, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 517 days.

(21) Appl. No.: 16/618,496

(22) PCT Filed: Jun. 1, 2018

(86) PCT No.: PCT/US2018/035546
§ 371 (c)(1),
(2) Date: Dec. 2, 2019

(87) PCT Pub. No.: WO2018/222960
PCT Pub. Date: Dec. 6, 2018

(65) Prior Publication Data
US 2020/0123389 A1  Apr. 23, 2020

Related U.S. Application Data

(60) Provisional application No. 62/514,431, filed on Jun. 2, 2017.

(51) Int. Cl.
| | |
|---|---|
| C09C 1/30 | (2006.01) |
| C01B 33/14 | (2006.01) |
| C08K 9/08 | (2006.01) |
| C08L 1/12 | (2006.01) |
| C08L 9/00 | (2006.01) |
| C08L 23/06 | (2006.01) |
| C08L 23/12 | (2006.01) |
| C08L 33/26 | (2006.01) |
| C08L 39/06 | (2006.01) |
| C08L 91/00 | (2006.01) |
| C09D 7/42 | (2018.01) |

(52) U.S. Cl.
CPC .......... C09C 1/3072 (2013.01); C01B 33/14 (2013.01); C08K 9/08 (2013.01); C08L 1/12 (2013.01); C08L 9/00 (2013.01); C08L 23/06 (2013.01); C08L 23/12 (2013.01); C08L 33/26 (2013.01); C08L 39/06 (2013.01); C08L 91/00 (2013.01); C09C 1/3018 (2013.01); C09C 1/3027 (2013.01); C09D 7/42 (2018.01); *C01P 2004/61* (2013.01); *C01P 2006/12* (2013.01); *C01P 2006/14* (2013.01); *C01P 2006/62* (2013.01)

(58) Field of Classification Search
None
See application file for complete search history.

(56) References Cited

U.S. PATENT DOCUMENTS

| | | | |
|---|---|---|---|
| 2,838,413 | A | 6/1958 | Young |
| 3,607,337 | A | 9/1971 | Eisenmenger |
| 3,816,154 | A | 6/1974 | Baldyga et al. |
| 4,038,224 | A | 7/1977 | Eisenmenger et al. |
| 4,097,302 | A | 6/1978 | Cohen et al. |
| 4,330,446 | A | 5/1982 | Miyosawa |
| 5,034,207 | A | 7/1991 | Kerner et al. |
| 5,221,337 | A | 6/1993 | Luers et al. |
| 5,326,395 | A | 7/1994 | Aldcroft et al. |
| 5,366,645 | A | 11/1994 | Sobottka |
| 5,562,978 | A | 10/1996 | Jacobson |
| 5,637,636 | A | 6/1997 | Cartwright et al. |
| 5,786,415 | A | 7/1998 | Blanchard et al. |
| 6,039,798 | A | 3/2000 | Aldcroft et al. |
| 6,103,004 | A | 8/2000 | Belligoi et al. |
| 6,383,280 | B1 | 5/2002 | Siray et al. |
| 6,395,247 | B1 | 5/2002 | Siray et al. |
| 6,531,524 | B2 | 3/2003 | Ring et al. |
| 6,627,139 | B2 | 9/2003 | Park et al. |
| 6,770,128 | B1 | 8/2004 | Lueers et al. |
| 6,800,267 | B2 | 10/2004 | Schubert et al. |
| 6,921,781 | B2 | 7/2005 | Schubert et al. |
| 7,117,766 | B1 | 10/2006 | Boehringer |
| 7,303,624 | B2 | 12/2007 | Meyer et al. |
| 7,305,271 | B2 | 12/2007 | Eriksson |
| 7,393,571 | B2 | 7/2008 | Chapman et al. |
| 7,490,785 | B2 | 2/2009 | Weidhaus |

(Continued)

FOREIGN PATENT DOCUMENTS

| | | |
|---|---|---|
| CN | 1328504 A | 12/2001 |
| CN | 1355830 A | 6/2002 |

(Continued)

OTHER PUBLICATIONS

Barrett et al., "The Determination of Pore vol. and Area Distributions in Porous Substances. I. Computations from Nitrogen Isotherms", J. Am. Chem. Soc., 1951, pp. 373-380, vol. 73.
PCT/US2018/035546 Search Report and Written Opinion, dated Aug. 28, 2018.
PCT/US2018/045096 Search Report and Written Opinion, dated Sep. 26, 2018.
EP3630882 Third Party Submission, dated Mar. 3, 2020.
Decision of Rejection on CN Application No. 201880050316.8 dated Feb. 16, 2022 (English translation included, 6 pages).
Examination Report on IN Application No. 201917053429 dated Jul. 12, 2021 (English translation included, 6 pages).

(Continued)

*Primary Examiner* — Ronak C Patel
(74) *Attorney, Agent, or Firm* — Foley & Lardner LLP

(57) ABSTRACT

Improved silica based matting agents are disclosed. The matting agents are useful in waterborne coatings composition to provide exceptional properties to a wood based substrate. Films resulting on the coated substrate unexpectedly provide improved chemical resistance, thermal stress resistance, weather resistance, and/or film clarity to the surface of a wood substrate. Methods of making and using the matting agents are also disclosed.

21 Claims, No Drawings

(56) References Cited

U.S. PATENT DOCUMENTS

| | | | |
|---|---|---|---|
| 7,596,894 | B1 | 10/2009 | Currey |
| 7,733,932 | B2 | 6/2010 | Faybishenko |
| 8,864,056 | B2 | 10/2014 | Paulat et al. |
| 8,926,748 | B2 | 1/2015 | Lehnert et al. |
| 9,139,736 | B2 | 9/2015 | Lindner et al. |
| 9,266,115 | B2 | 2/2016 | Kragten et al. |
| 9,546,285 | B2 | 1/2017 | Gebauer et al. |
| 2002/0055556 | A1 | 5/2002 | Schubert et al. |
| 2003/0078334 | A1 | 4/2003 | Doles et al. |
| 2003/0158315 | A1 | 8/2003 | Herbiet et al. |
| 2003/0171475 | A1 | 9/2003 | Miyazaki et al. |
| 2004/0047792 | A1 | 3/2004 | Schubert et al. |
| 2004/0097631 | A1 | 5/2004 | Morris et al. |
| 2004/0121156 | A1 | 6/2004 | Meyer et al. |
| 2004/0127604 | A1 | 7/2004 | Meyer et al. |
| 2004/0249049 | A1 | 12/2004 | Christian et al. |
| 2005/0014866 | A1 | 1/2005 | Hohner et al. |
| 2005/0065268 | A1 | 3/2005 | Morea-Swift et al. |
| 2005/0192367 | A1 | 9/2005 | Ou et al. |
| 2005/0287348 | A1 | 12/2005 | Faler et al. |
| 2006/0032146 | A1* | 2/2006 | Partch ............... H01L 21/3212 51/298 |
| 2006/0052236 | A1 | 3/2006 | Angevine et al. |
| 2006/0134423 | A1 | 6/2006 | Malet et al. |
| 2006/0257643 | A1 | 11/2006 | Birger |
| 2008/0182040 | A1 | 7/2008 | Chereau et al. |
| 2008/0254303 | A1 | 10/2008 | Ramsey |
| 2009/0098367 | A1 | 4/2009 | Wenzel et al. |
| 2010/0071593 | A1* | 3/2010 | Lehnert ............... C09C 3/10 106/270 |
| 2010/0083876 | A1 | 4/2010 | Lahary et al. |
| 2010/0087603 | A1* | 4/2010 | Brittain ............... C09C 1/309 525/342 |
| 2010/0189993 | A1 | 7/2010 | Mori et al. |
| 2010/0279123 | A1 | 11/2010 | Yokoyama et al. |
| 2010/0288164 | A1 | 11/2010 | Schubert et al. |
| 2011/0040013 | A1 | 2/2011 | Tsapatsis et al. |
| 2011/0092632 | A1 | 4/2011 | Brand et al. |
| 2011/0177306 | A1* | 7/2011 | Isojima ............... A61K 9/5153 428/203 |
| 2011/0213083 | A1 | 9/2011 | Takamura et al. |
| 2011/0229540 | A1 | 9/2011 | Canham et al. |
| 2011/0236493 | A1 | 9/2011 | Canham et al. |
| 2012/0142845 | A1 | 6/2012 | De Winter et al. |
| 2012/0202914 | A1 | 8/2012 | Benner et al. |
| 2012/0225290 | A1* | 9/2012 | Hartmann ............... C08F 136/06 525/332.8 |
| 2013/0079433 | A1 | 3/2013 | Lindner et al. |
| 2013/0243682 | A1 | 9/2013 | Park et al. |
| 2013/0261272 | A1 | 10/2013 | Herzog et al. |
| 2013/0280910 | A1 | 10/2013 | Ihnfeldt |
| 2014/0045958 | A1 | 2/2014 | Kraiter |
| 2014/0050928 | A1 | 2/2014 | Gebauer et al. |
| 2016/0177408 | A1 | 6/2016 | Watanabe |
| 2017/0306164 | A1 | 10/2017 | Jo et al. |
| 2018/0066141 | A1 | 3/2018 | Roland |
| 2018/0251642 | A1 | 9/2018 | Van Meulder |
| 2020/0123389 | A1 | 4/2020 | Gu |

FOREIGN PATENT DOCUMENTS

| | | |
|---|---|---|
| CN | 1585800 A | 2/2005 |
| CN | 102031035 A | 4/2011 |
| CN | 102217005 A | 10/2011 |
| CN | 103013325 B | 3/2016 |
| CN | 104087151 B | 9/2016 |
| CN | 104231904 A | 10/2016 |
| CN | 106009780 A | 10/2016 |
| CN | 106118448 A | 11/2016 |
| CN | 106273946 A | 1/2017 |
| CN | 106800812 A | 6/2017 |
| CN | 104949972 A | 9/2018 |
| CN | 108912991 A | 11/2018 |
| CN | 109777265 A | 5/2019 |
| CN | 110358438 A | 10/2019 |
| CN | 110791183 A | 2/2020 |
| CN | 110964432 A | 4/2020 |
| CN | 110997785 A | 4/2020 |
| DE | 1592865 A1 | 2/1971 |
| DE | 2521361 A1 | 11/1976 |
| DE | 40 32 619 A1 | 4/1992 |
| DE | 69800608 T2 | 6/2001 |
| DE | 69431927 T2 | 9/2003 |
| DE | 10253193 A1 | 6/2004 |
| DE | 102016224274 A1 | 6/2017 |
| EP | 0 442 325 A1 | 8/1991 |
| EP | 0 541 359 A1 | 5/1993 |
| EP | 0442325 B2 | 10/1997 |
| EP | 0759959 B1 | 6/1998 |
| EP | 1323786 A1 | 7/2003 |
| EP | 1582569 A1 | 10/2005 |
| EP | 1789719 A2 | 5/2007 |
| EP | 1828322 B1 | 12/2009 |
| EP | 1744223 B1 | 12/2011 |
| EP | 2571808 A1 | 3/2013 |
| EP | 2580291 B1 | 8/2014 |
| EP | 2760569 A2 | 8/2014 |
| EP | 3192835 A1 | 7/2017 |
| EP | 3272817 A1 | 1/2018 |
| EP | 2935471 B1 | 2/2018 |
| FR | 2902781 A1 | 12/2007 |
| GB | 470699 A1 | 8/1937 |
| GB | 1 363 039 A | 8/1974 |
| JP | 2006-521411 A | 9/2006 |
| JP | 2010-521539 A | 6/2010 |
| JP | 2014-177598 A | 9/2014 |
| JP | 2014-189687 A | 10/2014 |
| WO | 9951692 A1 | 10/1999 |
| WO | WO-2004/055120 | 7/2004 |
| WO | WO-2008/068003 | 6/2008 |
| WO | WO-2018/222960 A1 | 12/2018 |
| WO | 2019028312 A1 | 2/2019 |

OTHER PUBLICATIONS

Examination Report on IN Application No. 202017006266 dated Nov. 25, 2021 (English translation included, 6 pages).
Extended European Search Report on EP Application No. 18810154.7 dated Jan. 21, 2021 (6 pages).
Extended European Search Report on EP Application No. 18841056.7 dated Apr. 14, 2021 (9 pages).
First Office Action and Search Report on CN Application No. 201880056561.X dated Feb. 8, 2022 (English translation included, 25 pages).
First Office Action on CN Patent Application No. 201880050316.8 dated Mar. 2, 2022 (English translation included, 12 pages).
International Preliminary Report on Patentability in PCT/US2018/035546 dated Dec. 12, 2019 (8 pages).
International Preliminary Report on Patentability in PCT/US2018/045096 dated Feb. 13, 2020 (11 pages).
Morrow, A.M., et al., "A kinetic investigation into the effect of silica properties on the photo-oxidation of a water based silica coating," Polymer Degradation and Stability, 66:95-105 (1999).
Munzing: "CERETAN MXS 3815" Jun. 1, 2016, Retrieved from the Internet: URL: https://www.munzing.com/static/a8897a272bca7ac60256b25e2dafb484/td_CERETAN_MXS_3815_en_53b7a8e3f0.pdf, Accessed Dec. 21, 2020 (1 page).
Notification of Reasons for Rejection on JP Application No. 2019-566675 dated Dec. 17, 2021 (English translation included, 17 pages).
Search Report and Written Opinion on SG Application No. 11201911371V dated Jan. 14, 2021 (10 pages).
Search Report and Written Opinion on SG Application No. 11202000946R dated Dec. 24, 2020 (11 pages).
Second Office Action on CN Application No. 201880050316.8 dated Oct. 14, 2021 (English translation included, 7 pages).

(56) References Cited

OTHER PUBLICATIONS

Third Party Observation on EP Patent No. 3630882 (Application No. 18810154.7 dated Oct. 29, 2021 (English translation not available, 8 pages).

* cited by examiner

COATED PARTICLES AND METHODS OF MAKING AND USING THE SAME

FIELD OF THE INVENTION

The present invention is directed to improved silica based matting agents. In one aspect, the present invention relates to improved silica matting agents for waterborne coating systems. In another aspect, the invention relates to silica matting agents comprising particulate silica coated with a wax or organic polymers, aqueous coating compositions containing the matting agents and methods of making and using the compositions.

BACKGROUND

Silica based matting agents are widely used in coating and painting formulations to reduce the gloss of the coated films. In solvent based coating or 100% solid UV-cure formulations, high levels of silica are required for effective gloss reduction and matting. On the other hand, high concentration of hydrophilic silica can cause changes in the rheological properties of the solvent based lacquer and can often have dispersibility and settling problems. To solve these problems, typically the prior art is targeted at treating the surface of particulate silica to make the surface thereof hydrophobic and thus more compatible with solvent systems and organics in the formulations. To this end, wax and/or polymer coated silicas have often been used.

U.S. Pat. No. 6,039,798 discloses wax coated silica matting agent wherein the silica is an amorphous silica having a pore volume of at least 1.5 $cm^3/g$, preferably at least 1.8 $cm^3/g$. The wax coating is present in the range from 6% to 15% by weight of the matting agent and comprises a synthetic polyethylene wax.

EP0759959 discloses wax coated silica matting agent characterized in that the silica is an amorphous silica having a pore size distribution wherein 90% of the pores have a diameter above 15 nanometers, and less than 20% of the pore volume is in pores having a pore diameter between 10 and 30 nanometers, the wax coating being present in the range from about 2% to about 15% by weight of the matting agent and comprising a hard microcrystalline wax, a plasticising microcrystalline wax, a synthetic polyethylene wax or a mixture thereof.

US20050065268 discloses a silica matting agent comprises particulate amorphous silica in which the particles of silica have been treated with a hydrophilic polyolefin wax.

U.S. Pat. No. 6,921,781 discloses coating at least a portion of a surface of at least one silica particle with at least one wax, wherein the coating is carried out in at least one gas at a temperature above the melting point of the wax and below the decomposition temperature of the wax. The wax content is defined as 2-15% weight of that of silica.

U.S. Pat. No. 7,303,624 discloses a structurally coated silica can be prepared by spraying and mixing a pyrogenic silica with water and a coating agent in a suitable mixing vessel, then milling and then conditioning the product.

U.S. Pat. No. 8,926,748 discloses a matting agent useful for the preparation of matted coatings comprising, inorganic oxide particulates; and wax coated on the inorganic oxide particulates, wherein the wax possesses a crystallinity of about 50% or more and said wax is present in an amount ranging from 15 wt % to 30 wt % based on a total weight of said matting agent.

WO 1999051692 discloses an invention relating to a matting agent based on silicon dioxide, the silicon dioxide particles having a particle size of 2.5 to 20 μm and a moisture content of 0 to 65 wt. %, based on the matting agent, and being coated with 0.2 to 10 wt. % of a urea-urethane derivative or a mixture of urea-urethane derivatives.

Currently, solvent-based coating compositions are undesirable due to environmental concerns and safety and health issues. Government regulations have pushed for the reduction and elimination of volatile organic compounds (VOC) in paint or coating formulations and the use of substantially more waterborne coatings is promoted.

Various types of matting agents have been used in waterborne formulations, including, silica matting agents, organic matting agents, and blends of the two.

Silica based matting agents such as Acematt® TS100, Syloid® C807 have excellent matting efficiency, and film clarity in water borne formulations, but tend to have poorer chemical resistance and weather resistance, often whitening or turning cloudy when exposed to chemicals or changing weather conditions. Silica based matting agents also tend to have poor thermal stress resistance when subjected to rapid change of temperatures. While not wishing to be bound by any particular theory, an adhesive failure at the matting agent-latex interface resulting in a fissure that is an effective scatter of light as well as adhesive failure caused by stresses due to swelling (then shrinkage) of the film during wetting and drying of the film and is aggravated by particle shrinkage of the matting particles during drying, may be the cause of these drawbacks with silica matting agents in waterborne coating formulation. All these drawbacks are undesirable in coating applications on wood substrates.

Pure organic based organic matting agents have also been used. For example, urea-formaldehyde resin based matting agents, such as Deuteron® MK, and Ceraflour® 920 are known. However, both of the matting agents have environmental concerns since they can potentially release residual starting material, toxic formaldehyde. A modified, micronized polyethylene based matting agent Ceraflour® 929 is also available. However, this product has poor matting efficiency when compared to silica based matting agents in coating formulations. It is also known that organic matting agents have poorer film clarity when compared to pure silica based matting agents. This is probably due to the fact that silica based matting agents have a reflective index close to that of other components (for example, binders) in the coated film whereas the difference in the reflective index of organic based matting agents and such components is larger. In addition, organic matting agents are typically harder to produce and more expensive as well.

The blending of silica based matting agents and organic matting agents have also been used in water borne systems to balance the required coating film properties. However, this creates additional complexity in already complicated paint or coating formulation systems.

Consequently, there remain a need for simple solutions to develop matting agents that (i) are suitable for use in aqueous coating systems, and which (ii) provide one or more desired characteristics, in a final coating, such as, e.g., improved chemical resistance, improved thermal stress resistance, improved weather resistance, and/or improved film clarity, in combination with good matting efficiency.

SUMMARY

The present invention addresses aforementioned need in the art by the discovery of improved silica based matting agent useful in waterborne coatings composition, and methods of making and using the compositions. The aqueous compositions of the present invention provide exceptional properties to the coated surface of a wood based substrate. For example, use of coating compositions in accordance with the present invention can unexpectedly provide a coated film having improved chemical resistance, thermal stress resistance, weather resistance, and/or film clarity to the surface of a wood substrate.

Accordingly, the present invention provides improved silica based matting agents comprising silica particles having a specified amount of at least one component selected from (i) one or more waxes, (ii) one or more polymers, or (iii) any combination of (i) and (ii) on said particle surface.

Unexpectedly, it has been found that certain properties, e.g. chemical resistance, is increased when increased amounts of (i) or (ii) or (iii) is used to coat silica particles. In a desired embodiment, the improved silica based matting agent comprises greater than 30 weight percent (wt %) of at least one component (i) to (iii). In other embodiments of the invention, the silica based matting agent comprises at least 40 weight percent (wt %) of at least one component (i) to (iii).

In some exemplary embodiments, the aqueous coating compositions comprise the coated silica particles having a particle surface; and from about 40.0 wt % to about 50.0 wt % (or more), based on a total weight of the coated particles, of one or more waxes, such as a polyethylene wax, on the particle surface. In other exemplary embodiments, the aqueous compositions of the present invention comprise porous silica particles having a particle surface; and from about 45.0 wt % to about 50.0 wt % (or more), based on a total weight of the coated particles, of one or more polymers, such as a polydiene or vulcanized polydiene, on the particle surface.

The present invention also provides aqueous coating compositions or formulations comprising the improved silica based matting agents of the invention. In some exemplary embodiments, the coating compositions comprising the coated silica particles in accordance with the invention exhibit at least one of: (a) a film clarity ΔL* of less than 7.0 units, (b) a water damage 24 hr ΔL* of less than 5.0 units, (c) a 50/50 water/ethanol damage 1 hr ΔL* of less than 8.0 units, and (d) a 50/50 water/ethanol damage 4 hr ΔL* of less than 16.0 units, all as measured using a portable Spectro-Guide 45/0 colorimeter and the methods described herein. In some desired embodiments, the aqueous coating composition enables the coating composition to exhibit all of: (a) a film clarity ΔL* of less than 7.0 units, (b) a water damage 24 hr ΔL* of less than 5.0 units, (c) a 50/50 water/ethanol damage 1 hr ΔL* of less than 8.0 units, and (d) a 50/50 water/ethanol damage 4 hr ΔL* of less than 16.0 units, all as measured using a portable Spectro-Guide 45/0 colorimeter and the methods described herein.

The present invention is further directed to methods of making the coated silica based matting agents and the method of preparing aqueous coating compositions comprising the matting agents of the invention. In one exemplary embodiment, the present invention is also directed to methods of coating a substrate with the mentioned aqueous coating compositions. In a preferred embodiment, the substrate is a wood substrate.

In other embodiments, the method of using the herein-described coated particles comprises a method of improving the chemical resistance, the thermal stress resistance, the weather resistance, the film clarity, or any combination thereof, of a coating composition applied onto a wood substrate (e.g., a wood substrate), wherein the method comprises incorporating the herein-described coated particles into the coating composition prior to applying the coating composition onto the substrate. Unexpectedly, the herein-described coating compositions, provide improved protection to a given wood substrate, when compared to known liquid coating compositions as measured using a colorimeter (e.g., a portable Spectro-Guide 45/0 colorimeter).

The present invention is even further directed to substrates coated with (i) the herein-described coated particles or (ii) liquid compositions containing the herein-described coated particles. In some exemplary embodiments, the substrate comprises a wood substrate coated with (i) the herein-described coated particles or (ii) liquid compositions containing the herein-described coated particles.

These and other features and advantages of the present invention will become apparent after a review of the following detailed description of the disclosed embodiments and the appended claims.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a coated particle and/or composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents.

The present invention is directed to improve silica based matting agents comprising silica particles having a particle surface; and greater than 30.0 weight percent (wt %), based on a total weight of the coated particles, of (i) one or more waxes, (ii) one or more polymers, or (iii) any combination of (i) and (ii) coated on the particle surface. Typically, (i) the one or more waxes, (ii) the one or more polymers, or (iii) any combination of (i) and (ii) is present on the particle surface in an amount up to about 40.0 wt %, based on a total weight of the coated particles, but the coated particles of the present invention may comprise any amount of (i) the one or more waxes, (ii) the one or more polymers, or (iii) any combination of (i) and (ii) up to about 50.0 wt % (or more), based on a total weight of the coated particles. In some exemplary embodiments, the coated particles comprise from greater than 30.0 wt % to about 50.0 wt % (or any value greater than 30.0 and 50.0 or less wt %, in increments of 0.1 wt %, for example, about 35.1 wt %, or any range of values between 30.0 and 50.0 wt %, in increments of 0.1 wt %, for example, from about 30.3 to about 37.8 wt %), based on a total weight of the coated particles, of (i) the one or more waxes, (ii) the one or more polymers, or (iii) any combination of (i) and (ii) on the particle surface. In some exemplary embodiments, the coated particles comprise from about 40.0 wt % to about 50.0 wt % (or any value between 40.0 and 50.0 wt %, in increments of 0.1 wt %, for example, about 40.1 wt %, or any range of values between 40.0 and 50.0 wt %, in increments of 0.1 wt %, for example, from about 40.3 to about 47.8 wt %), based on a total weight of the coated particles, of (i) the one or more waxes, (ii) the one or more polymers, or (iii) any combination of (i) and (ii) on the particle surface.

Suitable particulate silica useful to prepare the matting agents of the present invention includes, but is not limited to, silica gel, precipitated silica, fumed silica and colloidal silica. Suitable silica also includes, but is not limited to, ordered mesoporous silica prepared through an organic template (e.g., a surfactant) during the formation of silica particles, followed by a high temperature pyrolysis to "burn off" the organics. Particularly preferred silica particles comprise silica gel or precipitated silica particles.

Commercially available porous silica particles that are suitable for use in the present invention include, but are not limited to, porous inorganic particles available from W. R. Grace (Columbia, MD) under the trade designation SYLOID® such as SYLOID® C807 silica gel particles and SYLOID® MX106 precipitated silica particles.

In a preferred embodiment, the silica particles comprise silica having a purity of at least about 93.0% by weight $SiO_2$, or at least about 93.5% by weight $SiO_2$, at least about 94.0% by weight $SiO_2$, at least about 95.0% by weight $SiO_2$, at least about 96.0% by weight $SiO_2$, at least about 97.0% by weight $SiO_2$, or at least about 98.0% by weight $SiO_2$ up to 100% by weight $SiO_2$ based upon the total weight of the particle.

The silica particles may have a variety of different symmetrical, asymmetrical or irregular shapes, including chain, rod or lath shape. The particles may have different structures including amorphous or crystalline, etc. In a preferred embodiment, the silica particles are amorphous. The particles may include mixtures of particles comprising different compositions, sizes, shapes or physical structures, or that may be the same except for different surface treatments. Porosity of the particles may be intraparticle or interparticle in cases where smaller particles are agglomerated to form larger particles.

As used herein, the term "crystalline" means a solid material whose constituent atoms, molecules, or ions are arranged in an ordered pattern extending in all three directions, which may be measured by X-ray diffraction or differential scanning calorimetry. As used herein, the term "amorphous" means a solid material whose constituent atoms, molecules, or ions are arranged in a random, non-ordered pattern extending in all three directions, which may be determined by X-ray diffraction or differential scanning calorimetry.

As used herein, the term "BET particle surface area" is defined as meaning a particle surface area as measured by the Brunauer Emmet Teller (BET) nitrogen adsorption method.

As used herein, the phrase "total pore volume" refers to the average pore volume of a plurality of particles determined using the Barrett-Joyner-Halenda (BJH) nitrogen porosimetry as described in DIN 66134.

As used herein, the phrase "particle size" refers to median particle size (D50, which is a volume distribution with 50 volume percent of the particles are smaller than this number and 50 volume percent of the particles are bigger than this number in size) measured by dynamic light scattering when the particles are slurried in water or an organic solvent such as acetone or ethanol.

The porous silica particles used to form the matting agents of the present invention may have a total pore volume of at least 0.30 cc/g, from about 0.30 cc/gm to about 2.20 cc/gm (or any value greater than 0.40 cc/gm up to and including 2.20 cc/gm, in increments of 0.01 cc/gm, e.g., 0.62 cc/gm, or any range of values between greater than 0.40 cc/gm up to and including 2.20 cc/gm, in increments of 0.01 cc/gm, e.g., from about 1.50 cc/gm to about 2.20 cc/gm), as determined by BJH method. Typically, the porous silica particles used to form the matting agents of the present invention have a total pore volume of from about 1.8 cc/gm to about 2.00 cc/gm, as determined by BJH method.

The porous silica particles used to form the matting agents of the present invention may also have a BET particle surface area of at least about 100 $m^2/g$ up to 1500 $m^2/g$ (or any value greater than 100 $m^2/g$ up to and including 1500 $m^2/g$, in increments of 1.0 $m^2/g$, e.g., 453 $m^2/g$, or any range of values between greater than 100 $m^2/g$ up to and including 1500 $m^2/g$, in increments of 1.0 $m^2/g$, e.g., from about 400 $m^2/g$ to about 444 $m^2/g$), or greater. Typically, the porous silica particles have a BET particle surface area of at least about 100 $m^2/g$ up to 900 $m^2/g$.

The uncoated silica particles of the present invention typically have an average particle size of from about 1.0 micron (μm) to about 50 μm (or any value between and including 1.0 μm up to about 50 μm, in increments of 0.1 μm, e.g., 45.0 μm, or any range of values between and including 1.0 μm up to about 50 μm, in increments of 0.1 μm, e.g., from about 3.2 μm to about 50.1 μm). However, it should be understood that the coated particles of the present invention may have any average particle size depending on the use of the coated particles. In some embodiemnts, the coated particles of the present invention have an average particle size of from about 3.0 μm to about 12.0 μm. The matting agents of the present invention may comprise one or more waxes coated on the particle surface and within the pores of the porous silica particles. When present, the one or more waxes may comprise, but are not limited to, a hydrocarbon wax (i.e., a wax comprising relatively long alkyl chains, e.g., alkyl chains having 20 or more carbon atoms therein, with or without one or more various functional groups such as fatty acids, primary and secondary long chain alcohols, unsaturated bonds, aromatics, amides, ketones, and aldehydes), a paraffin wax (i.e., from 20-40 carbon atoms without additional functional groups), a polyethylene wax, a polypropylene wax, a plant wax such as a carnauba wax (i.e., Brazil wax), an animal wax such as bee wax, or any combination thereof.

Commercially available waxes that are suitable for use in the present invention include, but are not limited to, waxes available from Mitsui Chemicals, LLC (Osaka, Japan) under the trade designations Hi-WAX™ or EXCEREX™ waxes, waxes available from Honeywell Performance Additives (Morristown, NJ) under the trade designations RHEOLUB® waxes; and waxes available from TH.C.TROMM GmbH (Cologne, Germany) under the trade designations Polarwachs® waxes.

In some embodiments, the matting agent comprise silica particles are coated with a polyethylene wax, a polypropylene wax, or a combination thereof. In some desired embodiments, the coating on the silica particles comprises a polyethylene wax having an average molecular weight of at least 2000. Such a relatively high molecular weight polyethylene wax is commercially available from TH.C.TROMM GmbH (Cologne, Germany) under the trade designations Polarwachs® wax.

When present, the one or more waxes are typically present in an amount of greater than 30 wt %, based on a total weight of the matting agents. Preferably, the one or more waxes are present in an amount ranging from about 31.0 wt % to about 50.0 wt % (or any value between 31.0 and 50.0 wt %, in increments of 0.1 wt %, for example, about 35.1 wt %, or any range of values between 31.0 and 50.0 wt %, in increments of 0.1 wt %, for example, from about 31.3 to about 37.8 wt %), based on a total weight of the matting agents. In some embodiments, the one or more waxes are present in an amount ranging from about 40.0 wt % to about 50.0 wt % (or any value between 40.0 and 50.0 wt %, in increments of 0.1 wt %, for example, about 45.1 wt %, or any range of values between 40.0 and 50.0 wt %, in increments of 0.1 wt %, for example, from about 40.3 to about 47.8 wt %), based on a total weight of said matting agents.

In another embodiment of this invention, the matting agents of the present invention may comprise one or more polymers, alone or in combination with the above-described one or more waxes, on the particle surface and within the pores of the porous silica particles. When present, the one or more polymers may comprise, but are not limited to, one or more polymers comprising: a polydiene (e.g., polyisoprene, polybutadiene, or a combination thereof), a vulcanized polydiene, a polyacrylamide, a polyvinyl polypyrrolidone, a cellulose acetate butyrate, or any combination thereof. In some desired embodiments, the one or more polymers comprise a polydiene, a vulcanized polydiene, or any combination thereof.

Commercially available polymers that are suitable for use in the present invention include, but are not limited to, polymers available from Kuraray Co., LTD (Tokyo, Japan) under the trade designations KL-10 liquid rubber polymer (i.e., polyisoprene).

When present, the one or more polymers are typically present in an amount of greater than 30 wt %, based on a total weight of the matting agents. Preferably the amount of the one or more polymers ranges from about 31.0 wt % to about 50.0 wt % (or any value between 31.0 and 50.0 wt %, in increments of 0.1 wt %, for example, about 35.1 wt %, or any range of values between 31.0 and 50.0 wt %, in increments of 0.1 wt %, for example, from about 31.3 to about 37.8 wt %), based on a total weight of the coated particles. In some embodiments, the one or more polymers are present in an amount ranging from about 31.0 wt % to about 40.0 wt % (or any value between 31.0 and 40.0 wt %, in increments of 0.1 wt %, for example, about 31.0 wt %, or any range of values between 31.0 and 40.0 wt %, in increments of 0.1 wt %, for example, from about 31.3 to about 31.8 wt %), based on a total weight of the coated particles.

Method of Preparing

The matting agents of the present invention may be prepared by contacting the porous silica particles with (i) one or more waxes, (ii) one or more polymers, or (iii) any combination of (i) and (ii) so as to result in coated porous silica particles having a particle surface; and greater than 30.0 wt %, based on a total weight of the coated particles, of (i) the one or more waxes, (ii) the one or more polymers, or (iii) any combination of (i) and (ii) on the particle surface. Any conventional method may be used to contact the porous silica particles with (i) one or more waxes, (ii) one or more polymers, or (iii) any combination of (i) and (ii) so as to result in coated porous silica particles.

In some embodiments, the contacting step may be a wet process. The wet contacting process step may comprise dissolving (i) the one or more waxes, (ii) the one or more polymers, or (iii) any combination of (i) and (ii) in a solvent to form a solvent mixture; incorporating the porous silica particles into the solvent mixture; and removing or evaporating the solvent from the solvent mixture, to form coated silica particles.

The coated silica particles may thereafter be subjected to size reduction. Any known method of reducing the particle size may be used, and include, but are not limited to, a milling step such as ball mill or a mortar pestle grinding step. In one embodiment, the coated particles are subjected to a size reduction step, wherein the average particle size of the coated particles is reduced to a first average particle size of less than about 500 microns ($\mu m$).

Once reduced in size, the coated silica particles are desirably heat treated at an elevated temperature for a heat treatment period of time. Typically, the elevated temperature is from about 90° C. to about 140° C. (or any value between 90° C. up to and including 140° C., in increments of 1.0° C., for example, about 100° C., or any range of values between 90° C. up to and including 140° C., in increments of 1.0° C., for example, from about 91.0° C. to about 102.0° C.). Typically, the heat treatment period of time ranges from about 1.0 hour (hr) to about 4.0 hr (or any value between 1.0 hr up to and including 4.0 hr, in increments of 1.0 minute, for example, about 1.0 hr and 9 minutes, or any range of values between 1.0 hr up to and including 4.0 hr, in increments of 1.0 minute, for example, from about 1.0 hr and 9 minutes to about 2.0 hr and 5 minutes).

In one exemplary embodiment in which one or more wax coatings are present, the elevated temperature of the heat treatment step ranges from about 100° C. to about 130° C., and the heat treatment period of time ranges from about 1.0 hr to about 1.5 hr. In another exemplary embodiment in which one or more polymers are present, the elevated temperature of the heat treatment step ranges from about 90° C. to about 100° C., and the heat treatment period of time ranges from about 2.5 hr to about 3.5 hr.

Following any heat treatment step, the heat-treated coated silica particles are allowed to cool. Once cooled, the heat-treated particles may optionally be further reduced in size so as to result in a final particle size of less than about 100 $\mu m$ (or any value less than about 100 $\mu m$, in increments of 1.0 $\mu m$, for example, about 45.0 $\mu m$, or any range of values between about 1.0 $\mu m$ up to and including 100 $\mu m$, in increments of 1.0 $\mu m$, for example, from about 4.0 $\mu m$ to about 6.7 $\mu m$). As discussed above, any known method of reducing particle size may be used. In one exemplary embodiment, a milling step may be utilized so as to result in coated particles having a final particle size of less than about 45.0 $\mu m$.

In other exemplary embodiments, the contacting step may not involve any solvent and therefore be a dry process. In one embodiment, the dry process may comprise melting (i) the one or more waxes, (ii) the one or more polymers, or (iii)

any combination of (i) and (ii) to form a liquid coating; and incorporating the porous silica particles into the liquid coating. In yet other embodiments, the dry process may comprise simultaneously contacting and mixing (a)(i) the one or more waxes, (ii) the one or more polymers, or (iii) any combination of (i) and (ii), and (b) the porous silica particles in a conventional mixer such as a ribbon blender, a Henschel mixer, a fluid energy mill (FEM) or a micronizing jet mill at high temperature (i.e., a temperature that melts any waxes and/or polymers if needed). In these embodiments, the heating and particle size reduction steps are combined and additional particle size reduction may or may not be necessary.

In some exemplary embodiments, the crosslinking of polymer coated silica particles are desirable for even better stability and properties. In another exemplary embodiment, the crosslinking comprises a vulcanization step. In methods that comprise a vulcanization step, elemental sulfur, a vulcanization promoter, or both, may be added to the one or more polymers during the contacting step. Suitable vulcanization promoters for use in the present invention include, but are not limited to, elemental sulfur, and butyl zimate.

Coating Compositions

The matting agents of present invention are useful to prepare coating compositions comprising aqueous suspensions or dispersions of the herein-described matting agents. In a preferred embodiment, the coating composition is a waterborne coating composition.

The coating compositions comprise the disclosed coated silica products in addition to various other ingredients used in coating compositions. Examples of other ingredients that can be present in the compositions include an aqueous binder resin, such as a self crosslinking modified acrylic copolymers emulsion or a LATEX acrylic binder Neocryl® KX12, a coalescent solvent such as dipropylene glycol n-butyl ether (DOWANOL™ PDnB). The composition may or may not contain color pigments such as organic pigments. When the composition contains a color pigment, a dispersant may be included in the formulation. When the composition contains no color pigment, the composition is called clear coat. Clear coats are preferred in wood coating as natural color and grain structure of wood, such as, teak, cherry, oak, walnut, mahogany and rose wood, is highly prized in applications, such as, furniture and wood carvings.

The balance of the composition is typically water. Other diluents can also be included aside from water, such as aliphatics, aromatics, alcohols, ketones, white spirit, petroleum distillate, esters, glycol ethers, low-molecular weight synthetic resins, and the like. Environmentally friendly diluents, such as water, are preferred.

Other miscellaneous additives can also be included in the compositions, including without limitation, additives to modify surface tension, improve flow properties, improve finished appearance, increase wet edge, improve pigment stability, impart antifreeze properties, control foaming, control skinning, etc. Further additives that can be included in the compositions include without limitation catalysts, thickeners, stabilizers, emulsifiers, texturizers, adhesion promoters, UV stabilizers, de-glossing agents, biocides to fight bacterial growth, and the like. Oil can be included as a rheology agent, gloss modifier and protective agent that will reduce damage to the coating that would otherwise result from forming processes and from degrative elements in the service environment of the coated materials.

The coating compositions of the present invention typically comprise (I) from about 1.0 wt % up to about 99.0 wt % (or any value between 1.0 wt % up to and including 99.0 wt %, in increments of 0.1 wt %, for example, about 5.1 wt %, or any range of values between 1.0 wt % up to and including 99.0 wt %, in increments of 0.1 wt %, for example, from about 1.3 to about 4.8 wt %) of the matting agents, and (II) from about 99.0 wt % to about 1.0 wt % (or any value between 99.0 wt % to and including 1.0 wt %, in increments of 0.1 wt %, for example, about 95.1 wt %, or any range of values between 99.0 wt % to and including 1.0 wt %, in increments of 0.1 wt %, for example, from about 98.3 to about 94.8 wt %) of one or more additional components, both component (I) and (II) being based on a total weight of the coating composition.

Use

The present invention is even further directed to the use of the matting agents in various coating applications/processes. When used as a matting agent in coating compositions, the herein-described coated silica particles provide one or more improved properties such as improved chemical resistance, improved thermal stress resistance, improved weather resistance, improved film clarity, or any combination thereof in the final coating.

In a preferred embodiment, the matting agents of the invention are useful in methods of improving chemical resistance, thermal stress resistance, weather resistance, and/or film clarity of a coating composition applied to a substrate. In a particularly preferred embodiment, the substrate is a wood substrate. In one desired embodiment, a wood substrate is treated with an aqueous coating composition thereof, wherein the coating composition comprises the matting agents of the invention on a surface of the wood substrate. Other substrates which may be coated with coating compositions in accordance with the present invention include, but are not limited to, leather, plastics (e.g.,vinyl), metal (e.g., coil) or metal alloys, cement or concrete or other industrial finishes.

Generally, the method of utilizing a matting agent in a coating composition in accordance with the invention comprises incorporating the inventive matting agents into the coating composition, preferably an aqueous coating composition, prior to applying the coating composition onto the substrate. The typical incorporation step includes mixing or dispersing the matting agents into the formulation. The method of applying the coating composition to a substrate includes brushing, rolling, air spraying, or drawdowning or other possible methods. As discussed further in the examples below, incorporation of the matting agent of the current invention into a coating composition (e.g., a wood substrate coating composition) and subsequent application of the coating composition, provide the coated films with improved chemical resistance, improved thermal stress resistance, improved weather resistance, and/or improved film clarity, when compared to known coatings/films that do not contain the matting agents of the present invention. For example, in some embodiments, a coating composition comprising the matting agents results in a clear coated film on a substrate, and the film exhibits a film clarity $\Delta L^*$ of less than 7.0 units (or any value less than 7.0 units, in increments of 0.1 units, for example, 2.4 units, or any range of values less than 7.0 units, in increments of 0.1 units, for example, from about 1.2 units to about 2.4 units) as measured using a portable Spectro-Guide 45/0 colorimeter and the method described in the examples below.

In some embodiments, a coating composition comprising the matting agents of the invention results in a coated film on a substrate, and the film exhibits a water damage 24 hr $\Delta L^*$ of less than 5.0 units (or any value less than 5.0 units, in increments of 0.1 units, for example, 2.4 units, or any range of values less than 5.0 units, in increments of 0.1 units, for example, from about 1.2 units to about 2.4 units) as measured using a portable Spectro-Guide 45/0 colorimeter and the method described in the examples below.

In some embodiments, a coating composition comprising the inventive matting agents results in a coated film on a substrate, and the film exhibits a 50/50 water/ethanol damage 1 hr $\Delta L^*$ of less than 8.0 units (or any value less than 5.0 units, in increments of 0.1 units, for example, 2.4 units, or any range of values less than 5.0 units, in increments of 0.1 units, for example, from about 1.2 units to about 2.4 units) as measured using a portable Spectro-Guide 45/0 colorimeter and the method described in the examples below.

In some embodiments, a coating composition comprising the herein-described coated particles results in a coated film on a substrate, and the film exhibits a 50/50 water/ethanol damage 4 hr $\Delta L^*$ of less than 16.0 units (or any value less than 16.0 units, in increments of 0.1 units, for example, 12.4 units, or any range of values less than 16.0 units, in increments of 0.1 units, for example, from about 10.2 units to about 12.4 units) as measured using a portable Spectro-Guide 45/0 colorimeter and the method described in the examples below.

In some desired embodiments, a coating composition comprising the herein-described coated particles results in a coated film on a substrate, and the film exhibits (i) a film clarity $\Delta L^*$ of less than 7.0 units (or any value less than 7.0 units, in increments of 0.1 units, for example, 2.4 units, or any range of values less than 7.0 units, in increments of 0.1 units, for example, from about 1.2 units to about 2.4 units), (ii) exhibits a water damage 24 hr $\Delta L^*$ of less than 4.0 units (or any value less than 4.0 units, in increments of 0.1 units, for example, 2.4 units, or any range of values less than 4.0 units, in increments of 0.1 units, for example, from about 1.2 units to about 2.4 units), (iii) a 50/50 water/ethanol damage 1 hr $\Delta L^*$ of less than 8.0 units (or any value less than 5.0 units, in increments of 0.1 units, for example, 2.4 units, or any range of values less than 5.0 units, in increments of 0.1 units, for example, from about 1.2 units to about 2.4 units), and (iv) a 50/50 water/ethanol damage 4 hr $\Delta L^*$ of less than 10.0 units (or any value less than 10.0 units, in increments of 0.1 units, for example, 8.4 units, or any range of values less than 10.0 units, in increments of 0.1 units, for example, from about 7.2 units to about 7.4 units), all measured using a portable Spectro-Guide 45/0 colorimeter and the method described in the examples below.

While not wishing to be bound by any particular theory, it is hypothesized that the improved properties of chemical/thermal stress resistance exhibited by the improved matting agents, and resulting films, may be due to one or more of the following factors: 1) reduction of particle shrinkage during drying; 2) improved adhesion between matting particle and the latex; 3) ability for wax/organic coating to better flow and fill in cracks as they form; 4) reduced stress on the latex-particle interface due to the softening of the latex in the region surrounding the particle, and 5) diffusion of the latex into the pores of the film, thereby reducing penetration of water and ethanol into the film.

It should be understood that although the above-described coated particles, methods and uses are described as "comprising" one or more components or steps, the above-described coated particles, methods and uses may "comprise," "consists of," or "consist essentially of" any of the above-described components or steps of the coated particles, methods and uses. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a coated particle, method and/or use that "comprises" a list of elements (e.g., components or steps) is not necessarily limited to only those elements (or components or steps), but may include other elements (or components or steps) not expressly listed or inherent to the particle, method and/or use.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define coated particles, methods and/or uses that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe (i) processes in accordance with the present invention for preparing coated particles, and (ii) the evaluation of the coated particles in coating compositions.

Example 1

Formation of Silica Particles Coated with Wax (Wet Method)

2.5-10 grams of wax were dissolved in 60-100 ml of toluene with heating. 10 g of SYLOID® C807 silica particles were mixed with the wax solution. The mixture was left in a crystallizing dish in a well ventilated fume hood overnight to allow all of the solvent to evaporate. The "dried" residue was subjected to mortar pestle to allow all the particles to pass a 500 μm screen. The screened particles were then subsequently heated at 130° C. for 1 hour. After drying, the particles were cooled down and the particle size was further reduced with an analytical mill to enable the particles to pass a 45 µm screen. The screened particles were suitable for use, as is, directly in, for example, a paint formulation.

Example 2

Formation of Silica Particles Coated with Polyisoprene Utilizing a Vulcanization Step (Wet Method)

4.3 grams of polyisoprene (10 kD MW, mostly trans-, KL-10, commercially available from Kuraray) were dissolved in 60 ml of toluene. 0.24 g of elemental sulfur and 0.12 g of butyl zimate (commercially available from Vanderbilt Chemicals, LLC) were added to the solution and mixed well. 10 g of SYLOID® C807 silica particles were mixed with the solution. The mixture was left in a crystallizing dish in a well ventilated fume hood overnight to allow all of the solvent to evaporate. The "dried" residue was then subjected to mortar pestle to allow all the particles to pass a 500 µm screen. The screened particles were subsequently heated at 95° C. for 3 hours. After that, the particles were cooled down and the particle size was further reduced with an analytical mill to enable most of the particles to pass a 45 µm screen. The screened particles were suitable for use, as is, directly in, for example, a paint formulation.

Example 3

Formation of Silica Particles Coated with Polyisoprene Without Utilizing a Vulcanization Step (Wet Method)

7.0 grams of polyisoprene (10 kD MW, mostly trans-, KL-10, commercially available from Kuraray) were dissolved in 60 ml of toluene. 10 g of SYLOID® C807 silica particles was mixed with the solution. The mixture was left in a crystallizing dish in a well ventilated fume hood overnight to allow all of the solvent to evaporate. The "dried" residue was then subjected to mortar pestle to allow all of the particles to pass a 500 µm screen. The screened particles were subsequently heated at 70° C. for 3 hours. After that, the particles were cooled down and the particle size was further reduced with an analytical mill to enable most of the particles to pass a 45 µm screen. The screened particles were suitable for use, as is, directly in, for example, a paint formulation.

Example 4

Formation of Silica Particles Coated with Wax with Melting and Mixing (Dry Method)

4 kg of SYLOID® C807 silica particles were mixed with 4 kg of POLARWACHS® N481 polyethylene wax under nitrogen in a 10L Henscher Mixer. The mixer was heated to 120° C. for 2 hours. The mixture was mixed with 3000 rpm for 2 hours. The sample was then cooled down to room temperature.

Example 5

Formation of Silica Particles Coated with Wax with Melting and Milling (Dry Method)

4 kg of silica gel (~30 µm particle size, 2 cc/g pore volume) particles were mixed with 4 kg of POLARWA-CHS® N481 polyethylene wax under nitrogen in a 10 L Henscher Mixer. The mixer was heated to 120° C. for 2 hours. The mixture was mixed with 3000 rpm for 2 hours. The sample was then cooled down to room temperature, and the composite was subjected to a fluid energy mill under nitrogen to bring the particle size down to 9 um (median particle size).

Example 6

Formation of a Stock Solution for Testing of Coating Compositions

The components listed in Table 1 below were combined as described below to form a stock solution for testing coating compositions as discussed below.

TABLE 1

Stock Solution For Testing of Coating Compositions

| Raw Material | Supplier | Weight (g) | Comments |
| --- | --- | --- | --- |
| NEOCRYL ® KX12 | DSM | 77.43 | Acrylic Emulsion |
| Deionized Water | | 11.07 | |
| DOWANOL ™ PDnB | Dow Chemical | 8.85 | Coalescent |
| BYK ® 024 | BYK | 0.55 | Defoamer |
| SURFYNOL ® 104E | Air Products | 1.11 | Wetting and Defoamer |
| RHEOLATE ® 299 | Elementis | 0.22 | Rheolate |
| BYK ® 346 | BYK | 0.77 | |

77.43 grams (g) of NEOCRYL® KX12 and 5.53 g of deionized water were mixed in a first container. 8.85 g of DOWANOL™ PDnB and 5.54 g of deionized water were mixed in a second container. Then, the contents of the second container were slowly poured into the first container. The mixture was dispersed at 1500 rpm for 15 minutes using a DISPERMAT® disperser from Gardner Company (Pompano Beach, FL) with a 30 mm wide blade.

0.55 g of BYK® 024, 1.11 g of SURFYNOL® 104E and 0.22 g of RHEOLATE® 299 were added to the mixture in the first container. The mixture was then dispersed at 2500 rpm for 10 minutes using the DISPERMAT® disperser.

0.77 g of BYK® 346 was added to the mixture in the first container. The mixture was then dispersed at 1000 rpm for 5 minutes using the DISPERMAT® disperser. The resulting mixture then was used as a stock solution, capable of being stored for up to 1 month.

Example 7

Formation of Coating Compositions Comprising a Matting Agent and the Stock Solution Coating compositions comprising a matting agent and the stock solution of Example 6 were prepared as follows. After a given amount of matting agent was added into a given amount of stock solution formed in Example 3 above, the resulting mixture was dispersed at 2500 rpm for 30 min using the DISPERMAT® disperser, and then allowed to sit overnight at room temperature.

Drawdowns for testing each coating composition were carried out the second day (i.e., the day after making a given coating composition) using the drawdown procedure described below.

Drawdown Procedure and Drawdown Cards

Drawdowns were carried out with a wire wound lab rod from Gardner Company with wire size of 40. With this size, the wet film thickness was about 100 µm. The draw down plates used were 219×286 mm² plain black charts from Leneta Company, Inc. (Mahwah, NJ). The procedure for each drawdown was as follows:

1. In a dust free clean room, a blank drawdown plate was placed on a vacuum holder.
2. Using a pipette, about 2-5 ml of a well-mixed coating composition sample was positioned on and near the top of a sample sheet.
3. The ends of the drawdown rod were immediately grasped. Using the thumbs of both hands to keep the rod from bowing or bending away from the sample, the drawdown rod was drawn down through the liquid pool, spreading and metering the fluid across the sample sheet. After a given drawdown was made, the drawdown rod was immersed in a cleaning tray after use.
4. After the drawdown, the drawdown samples were left at room temperature for at least four days to allow complete drying of the coated layer.
5. After the coated drawdown plate was dry, chemical resistance, film clarity, matting efficiency and cold check tests were carried out using the procedures below.

Gloss (Matting Efficiency), Film Clarity and Chemical Resistance Measurement and Test Methods:

A portable Micro-TRI-Gloss meter (from BYK-Gardner USA, Columbia, Md.) was used for film gloss reading. 60° gloss values were measured and reported.

For film clarity and chemical damage check, a portable Spectro-Guide 45/0 colorimeter (also from BYK-Gardner) was used. The L* values were obtained by readings of the colorimeter on a given coated film. On the card with black background, unmatted stock solution (from Example 6) gave an L* value of around 7.9. The addition of a matting agent (e.g., silica) in the stock solution made the film whiter (i.e., resulting in a higher L* value) and the film clarity matted film was defined as the difference between the new L* value and the L* value from the film formed out of the stock solution containing no matting agent.

Chemical Resistance test methods used were similar to European standard specifications EN 12720/DIM 68861-1. Resistances towards deionized water and 50/50 ethanol in water were tested. The test were carried out as follows 1. Circles (1 inch in diameter) were cut out of a Fisher-brand filter paper.
2. Circles were soaked in either water or 50/50 ethanol/water for 30 seconds.
3. Each soaked circle was placed onto a dried drawdown card, and then covered with a weighing boat to prevent evaporation.
4. After a certain amount of time (i.e., 24 hours for water test, and 1 hour and 4 hours for the 50/50 ethanol in water), the weighing boat and paper were removed.
5. A white mark in the contact area developed over time, and after overnight, the L* values were measured using the Spectro-Guide 45/0 colorimeter.
6. The chemical damage (inversely proportional to the chemical resistance) was defined as the difference between the L* value of the white mark (i.e., the largest reading out of at least three readings) and the background of the film. The percentage of change was also calculated.

Cold Check Test

This test was designed to simulate weather change and relative humidity change, which affects water resistance of and water penetration into a given coating. The test was carried out by allowing a dried drawdown card to go through the following environment for 5 cycles: a relative humidity=95% for a first phase at −20° C. for 1 hour, and a second phase at 50° C. for 1 hour, then repeated for a total of 5 cycles. After these cycles, the L* values were measured using the Spectro-Guide 45/0 colorimeter and were compared against the values before these cycles.

Example 8

Formation of Coated Particles of the Invention

Sample coated particles were prepared using the materials shown in Table 2 below. The first nine samples was prepared using the procedures outlined in Example 1 above. Sample 10 was prepared using the procedures outlined in Example 4, and Sample 11 was prepared using the procedures outlined in Example 5.

TABLE 2

Coated Particle Sample Formulations

| Coated Particle Sample Number | Starting Silica Particles | Silica Particle Source | Wax | Wax Source | Wax/Silica Amounts (in grams) (% Total Organic) |
|---|---|---|---|---|---|
| 1 | SYLOID® C807 silica gel | W. R. Grace (Columbia, MD) | POLARWACHS® N481 polyethylene wax | TH. C. TROMM GmbH | 2.5/10 (20%) |
| 2 | SYLOID® C807 silica gel | W. R. Grace (Columbia, MD) | POLARWACHS® N481 polyethylene wax | TH. C. TROMM GmbH | 4.3/10 (30%) |
| 3 | SYLOID® C807 silica gel | W. R. Grace (Columbia, MD) | POLARWACHS® N481 polyethylene wax | TH. C. TROMM GmbH | 7.0/10 (40%) |
| 4 | SYLOID® C807 silica gel | W. R. Grace (Columbia, MD) | POLARWACHS® N481 polyethylene wax | TH. C. TROMM GmbH | 10.0/10 ((50%) |
| 5 | SYLOID® MX106 precipitated silica | W. R. Grace (Columbia, MD) | POLARWACHS® N481 polyethylene wax | TH. C. TROMM GmbH | 7.0/10 (40%) |

TABLE 2-continued

Coated Particle Sample Formulations

| Coated Particle Sample Number | Starting Silica Particles | Silica Particle Source | Wax | Wax Source | Wax/Silica Amounts (in grams) (% Total Organic) |
|---|---|---|---|---|---|
| 6 | SYLOID® MX106 precipitated silica | W. R. Grace (Columbia, MD) | POLARWACHS® N481 polyethylene wax | TH. C. TROMM GmbH | 7.0/10 (40%) |
| 7 | | W. R. Grace (Columbia, MD) | Carnauba wax | Aldrich | 7.0/10 (40%) |
| 8 | SYLOID® MX106 precipitated | W. R. Grace (Columbia, MD) | NP 506 polypropylene wax | Mitsui (San Jose, CA) | 7.0/10 (40%) |
| 9 | ACEMATT® TS100 fumed silica | Evonik (Essen, Germany) | POLARWACHS® N481 polyethylene wax | TH. C. TROMM GmbH (Cologne, Germany) | 7.0/10 (40%) |
| 10 | SYLOID® C807 silica gel | W. R. Grace (Columbia, MD) | POLARWACHS® N481 polyethylene wax | TH. C. TROMM GmbH | 5 kg/5 kg (50%) |
| 11 | Large particle size silica gel | W. R. Grace (Columbia, MD) | POLARWACHS® N481 polyethylene wax | TH. C. TROMM GmbH | 5 kg/5 kg (50%) |

Example 9

Comparative Particles

Comparative particles shown in Table 3 below were used as received without further modification.

TABLE 3

Comparative Sample Particles

| Comparative Particle Sample Number | Comparative Matting Agent |
|---|---|
| Comp 1 | SYLOID® C807 silica gel |
| Comp 2 | SYLOID® MX106 precipitated silica |
| Comp 3 | ACEMATT® TS100 fumed silica |
| Comp 4 | Fumed silica + organic (TS100 + CERAFLOUR® 920) |
| Comp 5 | Fumed silica + wax (TS100 + CERAFLOUR® 929) |

In Table 3, in Comparative Example 4, the organic used was CERAFLOUR® 920, which is a urea-formaldehyde based organic matting agent, and the wax used in Comparative Example 5 was CERAFLOUR® 929, which is a micronized polyethylene wax based organic matting agent. Both of these were commercially available from BYK-Chemie GmbH (Wesen, Germany). In both Comparative Examples 4 and 5, mixtures of the pure silica and organic matting agents (physical blends of the two types of matting agents) were used in the paint formulations.

Example 10

Formation of Specific Coating Compositions

Matting agent-containing coating compositions were prepared using the coated particles of the present invention of Example 8 and the comparative sample particles of Example 9. Each matting agent-containing coating composition was prepared using the procedure described in Example 7 above. After formation, each matting agent-containing coating composition was drawdown using the draw-down procedure described hereinabove. After drying, each of the resulting films was evaluated for gloss, film clarity and chemical resistance according to the methods described above. Table 4 below summarizes the results.

TABLE 4

Test Results For Coatings Containing Coated Particle Samples and Comparative Particle Samples

| Coating Sample Number | % Matting agent in Coating | 60° Gloss | Film Clarity ($\Delta L^*$) | Water Damage 24 hr ($\Delta L^*$) (% Change) | 50/50 Damage 1 hr ($\Delta L^*$) (% Change) | 50/50 Damage 4 hr ($\Delta L^*$) (% Change) |
|---|---|---|---|---|---|---|
| 1 | 3.75 | 12.1 | 6.46 | 6.8 (47%) | 14.4 (100%) | 15.2 (106%) |
| 2 | 4.30 | 11.6 | 6.35 | 4.7 (33%) | 10.9 (76%) | 11.2 (78%) |
| 3 | 5.00 | 12.9 | 6.00 | 3.1 (22%) | 6.8 (49%) | 8.4 (61%) |
| 4 | 6.00 | 14.1 | 5.97 | 1.1 (8%) | 0.2 (1%) | 3.7 (27%) |
| 5 | 5.00 | 13.1 | 6.50 | 2.6 (18%) | 11.4 (79%) | 11.6 (80%) |
| 6 | 5.00 | 14.0 | 6.22 | 1.6 (11%) | n/a | 9.0 (63%) |
| 7 | 5.00 | 17.8 | 4.41 | 1.2 (10%) | 11.0 (89%) | 9.8 (79%) |
| 8 | 5.00 | 13.6 | 6.21 | 1.1 (7%) | 9.4 (66%) | 11.6 (8%) |
| 9 | 5.00 | 12.3 | 5.55 | 5.0 (37%) | 1.9 (14%) | 6.5 (49%) |
| 10 | 6.00 | 14.1 | 5.3 | 0.8 (6%) | 2.1 (16%) | 4.7 (35%) |
| 11 | 6.00 | 12.6 | 4.7 | 0.7 (6%) | 1.4 (11%) | 4.2 (34%) |
| Comp 1 | 3.00 | 12.7 | 7.59 | 10.7 (69%) | 19.2 (124%) | 20.0 (129%) |
| Comp 2 | 3.00 | 8.4 | 7.69 | 7.2 (46%) | n/a | 18.2 (117%) |
| Comp 3 | 3.00 | 13.6 | 5.65 | 17.2 (127%) | 12.8 (94%) | 24.2 (179%) |

TABLE 4-continued

Test Results For Coatings Containing Coated Particle Samples and Comparative Particle Samples

| Coating Sample Number | % Matting agent in Coating | 60° Gloss | Film Clarity ($\Delta L^*$) | Water Damage 24 hr ($\Delta L^*$) (% Change) | 50/50 Damage 1 hr ($\Delta L^*$) (% Change) | 50/50 Damage 4 hr ($\Delta L^*$) (% Change) |
|---|---|---|---|---|---|---|
| Comp 4 | 4.00 (2 + 2) | 10.7 | 7.16 | 16.6 (110%) | 10.1 (67%) | 19.5 (129%) |
| Comp 5 | 5.00 (2.5 + 2.5) | 10.0 | 6.95 | 11.8 (79%) | 9.4 (64%) | 18.4 (124%) |

As shown in Table 4 above, all wax coated matting agents of the present invention exhibited improved chemical resistance when compared to that obtained from the comparative samples. In samples 1-4 and comparative sample 1, as the wax level increased, the chemical resistance increased as represented by lower $\Delta L^*$ values.

Also, when compared to Sample 9 and Comparative Samples 4, 5, wax coating resulted in much better chemical resistance than simple physical blending of the silica with organic based matting agents.

Table 5 below shows the improvement of the Cold Check properties of coatings formed using the coated particles of the present invention using the Cold Check test method described hereinabove.

TABLE 5

Cold Check Test Results

| Coating Sample Number | Loading (g + 100 g Stock) | Change in L* Values | | |
|---|---|---|---|---|
| | | Initial | After 5 Cycles | % Change |
| 6 | 5.00 | 15.5 | 15.5 | 0% |
| Comp 2 | 3.00 | 15.6 | 21.9 | 41% |

As shown, with a wax coating, significant reduction (0% change vs. 41% change) of 'whiteness' was obtained.

Example 11

Formation of Additional Specific Coating Compositions

Two additional matting agent-containing coating compositions were prepared using (i) polyisoprene coated silica (4.3 g of polyisopyrene and 10 g of SYLOID® C807 silica gel particles with vulcanization) formed using the procedure described in Example 2 above, (ii) polyisoprene coated silica (7.0 g of polyisopyrene and 10 g of SYLOID® C807 silica gel particles without vulcanization) formed using the procedure described in Example 3 above, and (iii) Comparative particles designated Comp 1 above. Each matting agent-containing coating composition was prepared using the procedure described in Example 7 above. After formation, each matting agent-containing coating composition was drawdown using the draw-down procedure described hereinabove. After drying, each of the resulting films was evaluated for gloss, film clarity and chemical resistance according to the methods described above. Table 6 below summarizes the results.

TABLE 6

Test Results For Coating Samples 12-13 and Comparative Coating Sample 1

| Coating Sample Number | Particle Sample Information | Loading (g + 100 g Stock) | 60° Gloss | Film Clarity ($\Delta L^*$) | Water Damage 24 hr ($\Delta L^*$) (% Change) | 50/50 Damage 1 hr ($\Delta L^*$) (% Change) | 50/50 Damage 4 hr ($\Delta L^*$) (% Change) |
|---|---|---|---|---|---|---|---|
| 12 | 30% Organic, with Vulcanization | 4.00 | 14.4 | 6.37 | 3.2 (22%) | 7.8 (55%) | 9.5 (67%) |
| 13 | 40% Organic, without Vulcanization | 6.00 | 12.5 | 7.24 | 3.2 (21%) | 1.8 (12%) | 6.2 (41%) |
| Comp 1 | Unmodified Silica | 3.00 | 12.7 | 7.59 | 10.7 (69%) | 19.2 (124%) | 20.0 (129%) |

As shown in Table 6 above, polyisoprene coated silica particles (with or without vulcanization) also provided significant chemical resistance improvement compared to unmodified silica particles.

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A matting agent comprising coated silica particles, said coated particles consisting of:
    silica particles having a particle surface; and
    greater than 30.0 weight percent (wt %), based on a total weight of said silica particles, of (i) one or more waxes, (ii) one or more polymers, or (iii) any combination of (i) and (ii) coated on said particle surface;
    wherein said one or more polymers comprise polydiene, vulcanized polydiene, polyvinyl polypyrrolidone, cellulose acetate butyrate, or any combination thereof; and
    wherein the coated silica particles are solvent-free, free-flowing particles and have an average particles size of from about 3.0 µm to about 12 µm.

2. The matting agent of claim 1, wherein said silica particles comprise 31.0 wt % to about 50.0 wt %, based on a total weight of said silica particles, of (i) said one or more waxes, (ii) said one or more polymers, or (iii) any combination of (i) and (ii) on said particle surface.

3. The matting agent of claim 1, wherein said silica particles comprise from about 40.0 wt % to about 50.0 wt %, based on a total weight of said silica particles, of (i) said one or more waxes, (ii) said one or more polymers, or (iii) any combination of (i) and (ii) on said particle surface.

4. The matting agent of claim 1, wherein said silica particles comprise silica gel, precipitated silica or fumed silica particles.

5. The matting agent of claim 1, wherein said silica particles have a total pore volume of from about 0.30 cc/gm to about 2.20 cc/gm, as determined by Barrett-Joyner-Halenda (BJH) method, and a BET particle surface area of at least about 100 m$^2$/g up to 1500 m$^2$/g, or greater.

6. The matting agent of claim 5, wherein said silica particles have a total pore volume of from about 1.8 cc/gm to about 2.0 cc/gm, as determined by BJH method, and a BET particle surface area of at least about 200 m$^2$/g up to 900 m$^2$/g.

7. The matting agent of claim 1, wherein said coated particles comprise said one or more waxes.

8. The matting agent of claim 7, wherein said one or more waxes comprise a hydrocarbon wax, a paraffin wax, a polyethylene wax, a polypropylene wax, a plant wax, an animal wax, or any combination thereof.

9. The matting agent of claim 8, wherein said one or more waxes comprise a polyethylene wax, a polypropylene wax, or a combination thereof.

10. The matting agent of claim 1, wherein said coated particles consist of silica particles having a particle surface and greater than 30.0 wt. %, based on a total weight of said silica particles, of one or more polymers, wherein said one or more polymers comprise polydiene, vulcanized polydiene, polyvinyl polypyrrolidone, cellulose acetate butyrate, or any combination thereof.

11. The matting agent of claim 1, when incorporated into a coating composition and applied onto a substrate, enables the coating composition to (i) form a film having a film clarity ΔL* of less than 7.0 units as measured using a portable Spectro-Guide 45/0 colorimeter, and (ii) exhibit a water damage 24 hr ΔL* of less than 5.0 units as measured using a portable Spectro-Guide 45/0 colorimeter.

12. The matting agent of claim 11, when incorporated into a coating composition and applied onto a substrate, enables the coating composition to exhibit a 50/50 water/ethanol damage 1 hr ΔL* of less than 8.0 units as measured using a portable Spectro-Guide 45/0 colorimeter.

13. The matting agent of claim 12, when incorporated into a coating composition and applied onto a substrate, enables the coating composition to exhibit a 50/50 water/ethanol damage 4 hr ΔL* of less than 16.0 units as measured using a portable Spectro-Guide 45/0 colorimeter.

14. The matting agent of claim 1, when incorporated into a coating composition and applied onto a substrate, enables the coating composition to exhibit (i) a film clarity ΔL* of less than 7.0 units, (ii) a water damage 24 hr ΔL* of less than 4.0 units, (iii) a 50/50 water/ethanol damage 1 hr ΔL* of less than 8.0 units, and (iv) a 50/50 water/ethanol damage 4 hr ΔL* of less than 10.0 units, all measured using a portable Spectro-Guide 45/0 colorimeter.

15. A coating composition comprising the matting agent of claim 1.

16. The coating composition of claim 15, wherein said composition comprises an aqueous composition.

17. A substrate coated with the coating composition of claim 15, wherein said substrate comprises a wood substrate.

18. A method of preparing the matting agent of claim 1, said method comprising:
    contacting the porous silica particles with (i) the one or more waxes, (ii) the one or more polymers, or (iii) any combination of (i) and (ii) so as to form coated silica paricles;
    heat treating the coated silica particles at an elevated temperature for a heat treatment period of time so as to form heat-treated coated particles;
    allowing the heat-treated coated particles to cool; and
    milling the heat-treated coated particles so as to result in a final particle size of less than about 100 µm.

19. The method of claim 18, wherein the coated silica particles are heat treated at elevated temperature ranges from about 90° C. to about 140° C., and the heat treatment period of time ranges from about 1.0 hour (hr) to about 4.0 hr.

20. A method of improving chemical resistance, thermal stress resistance, weather resistance, film clarity, or any combination thereof, of a waterborne coating composition applied to a wood substrate, said method comprising:
    incorporating the matting agent of claim 1 into the coating composition;
    applying the coating composition onto at least one surface of a wood substrate to form a coating; and
    drying the coating to form a film on at least one surface of the wood substrate.

21. The method of claim 20, wherein the film exhibits (i) a film clarity ΔL* of less than 7.0 units, (ii) a water damage 24 hr ΔL* of less than 4.0 units, (iii) a 50/50 water/ethanol damage 1 hr ΔL* of less than 8.0 units, and (iv) a 50/50 water/ethanol damage 4 hr ΔL* of less than 10.0 units, all measured using a portable Spectro-Guide 45/0 colorimeter.

* * * * *